US012756098B2

(12) United States Patent
Kim et al.

(10) Patent No.: US 12,756,098 B2
(45) Date of Patent: Oct. 6, 2026

(54) ANTENNA DEVICE AND DISPLAY DEVICE INCLUDING THE SAME

(71) Applicant: DONGWOO FINE-CHEM CO., LTD., Jeollabuk-do (KR)

(72) Inventors: Young Ju Kim, Gyeonggi-do (KR); Gi Taek Oh, Gyeonggi-do (KR); Won Hee Lee, Gyeonggi-do (KR); Eun Hyun Cho, Gyeonggi-do (KR)

(73) Assignee: DONGWOO FINE-CHEM CO., LTD., Jeollabuk-do (KR)

( * ) Notice: Subject to any disclaimer, the term of this patent is extended or adjusted under 35 U.S.C. 154(b) by 320 days.

(21) Appl. No.: 18/206,764

(22) Filed: Jun. 7, 2023

(65) Prior Publication Data

US 2023/0411852 A1 Dec. 21, 2023

(30) Foreign Application Priority Data

Jun. 21, 2022 (KR) ........................ 10-2022-0075841

(51) Int. Cl.
*H01Q 9/04* (2006.01)
*H01Q 1/24* (2006.01)
*H01Q 21/08* (2006.01)

(52) U.S. Cl.
CPC ........... *H01Q 9/0407* (2013.01); *H01Q 1/243* (2013.01); *H01Q 21/08* (2013.01)

(58) Field of Classification Search
CPC ...... H01Q 9/0407; H01Q 1/243; H01Q 21/08; H01Q 1/364; H01Q 1/245; H01Q 1/52; H01Q 1/22; H01Q 1/36; H01Q 1/38; H01Q 1/50; H01Q 23/00; H01Q 21/061
See application file for complete search history.

(56) References Cited

U.S. PATENT DOCUMENTS

| | | | | |
|---|---|---|---|---|
| 11,411,299 | B2 * | 8/2022 | Kim | H01Q 9/0407 |
| 2022/0029280 | A1 * | 1/2022 | Huh | H01Q 1/364 |
| 2022/0037765 | A1 * | 2/2022 | Lee | H01Q 1/38 |
| 2022/0158350 | A1 * | 5/2022 | Choi | H01Q 9/0471 |

FOREIGN PATENT DOCUMENTS

| | | |
|---|---|---|
| KR | 10-2003-0095557 A | 12/2003 |
| KR | 10-1357589 B1 | 2/2014 |
| KR | 10-2022-0065474 A | 5/2022 |
| KR | 10-2022-0083150 A | 6/2022 |

OTHER PUBLICATIONS

Office action issued on May 22, 2026 from Korean Patent Office in a counterpart Korean Patent Application No. 10-2022-0075841 (all the cited references are listed in this IDS.) (English translation is also submitted herewith.).

* cited by examiner

*Primary Examiner* — Minh Tran
(74) *Attorney, Agent, or Firm* — The PL Law Group, PLLC

(57) ABSTRACT

An antenna device may include a substrate layer including a radiation region and a bonding region, an antenna unit including a radiator disposed on the radiation region of the substrate layer, and a transmission line disposed on the substrate layer and connected to the radiator, and a dummy bonding pad disposed on the bonding region of the substrate layer and physically spaced apart from the radiator in a width direction.

19 Claims, 5 Drawing Sheets

ANTENNA DEVICE AND DISPLAY DEVICE INCLUDING THE SAME

CROSS-REFERENCE TO RELATED APPLICATION AND CLAIM OF PRIORITY

This application claims priority to Korean Patent Application No. 10-2022-0075841 filed on Jun. 21, 2022 in the Korean Intellectual Property Office (KIPO), the entire disclosures of which are incorporated by reference herein.

BACKGROUND

1. Field

The present invention relates to an antenna device and a display device including the same. More particularly, the present invention relates to an antenna device including a substrate layer and an electrode and a display device including the same.

2. Description of the Related Art

As information technologies have been developed, a wireless communication technology such as Wi-Fi, Bluetooth, etc., or a non-contact sensing such as a gesture detection and a motion recognition is being applied to or embedded in image display devices, electronic devices and architecture. For example, an antenna for performing communication in a high frequency or ultra-high frequency band is applied to various mobile devices.

For example, the wireless communication technology is combined with a display device in, e.g., the form of a smartphone. In this case, the antenna may be combined with the display device to provide a communication function.

As the display device to which the antenna is employed becomes thinner and lighter, a space for the antenna may also decrease. As a driving frequency of the antenna increases, signal loss may easily occur, and the antenna having high gain and broadband properties may not be easily implemented in the limited space. Further, when an intermediate circuit structure such as a flexible printed circuit board (FPCB) is used to electrically connect a driving integrated circuit (IC) chip and the antenna, additional signal loss and disturbance may be caused.

Thus, developments of an antenna being capable of realizing broadband, high gain and high frequency properties in a limited space and being free from the influence of intermediate circuit structure are needed.

For example, Korean Published Patent Application No. 2003-0095557 discloses an antenna structure embedded in a portable terminal.

SUMMARY

According to an aspect of the present invention, there is provided an antenna structure having improved signaling efficiency and radiation reliability.

According to an aspect of the present invention, there is provided a display device including the antenna structure.

(1) An antenna device, including: a substrate layer including a radiation region and a bonding region; an antenna unit including a radiator disposed on the radiation region of the substrate layer, and a transmission line disposed on the substrate layer and connected to the radiator; and a dummy bonding pad disposed on the bonding region of the substrate layer and physically spaced apart from the radiator in a width direction.

(2) The antenna device according to the above (1), wherein the dummy bonding pad is disposed at an outside of an area between extension lines of both lateral sides of the radiator, and a spacing distance in the width direction between the dummy bonding pad and the extension line of one lateral side of the radiator is equal to or greater than half a wavelength ($\lambda/2$) of a resonance frequency of the radiator.

(3) The antenna device according to the above (1), wherein a width of the dummy bonding pad is equal to or greater than half a wavelength ($\lambda/2$) of a resonance frequency of the radiator.

(4) The antenna device according to the above (1), wherein the dummy bonding pad includes a pair of dummy bonding pads facing each other with the antenna unit interposed therebetween.

(5) The antenna device according to the above (4), wherein a sum of widths of the pair of dummy bonding pads is greater than or equal to a width of the antenna unit.

(6) The antenna device according to the above (1), wherein the dummy bonding pad has a trapezoidal shape, an inverted trapezoidal shape or a rectangular shape.

(7) The antenna device according to the above (6), wherein at least one side of the dummy bonding pad extends in a bent line shape, a wavy shape or a sawtooth shape.

(8) The antenna device according to the above (1), wherein the substrate layer further includes a buffer region disposed between the radiation region and the bonding region, and the radiator is disposed on the radiation region and the buffer region, a portion disposed on the radiation region of the radiator has a mesh structure, and a portion disposed on the buffer region of the radiator has a solid structure.

(9) The antenna device according to the above (8), wherein the transmission line is disposed on the bonding region of the substrate layer and has a solid structure.

(10) The antenna device according to the above (8), wherein the dummy bonding pad is not disposed on the buffer region of the substrate layer.

(11) The antenna device according to the above (8), further including a dummy mesh pattern disposed around the antenna unit and spaced apart from the antenna unit.

(12) The antenna device according to the above (1), wherein a plurality of the antenna units are arranged in the width direction to form an antenna array, and the dummy bonding pad is disposed at an outside of a region between extension lines of lateral sides of outermost radiators in the antenna array.

(13) The antenna device according to the above (1), wherein the substrate layer has an antenna active area where the antenna unit is disposed, and the dummy bonding pad is disposed at an outside of the antenna active area.

(14) The antenna device according to the above (13), wherein the antenna unit further includes a ground pad disposed around the transmission line and spaced apart from the radiator and the transmission line.

(15) The antenna device according to the above (1), wherein the dummy bonding pad and the antenna unit are disposed at the same level.

(16) The antenna device according to the above (1), wherein a thickness of the antenna unit and a thickness of the dummy bonding pad are the same.

(17) The antenna device according to the above (1), wherein a resonance frequency of the radiator is in a range from 50 GHz to 80 GHz.

(18) The antenna device according to the above (1), further including a circuit board electrically connected to the antenna unit.

(19) The antenna device according to the above (18), further including a conductive intermediate structure connecting the circuit board and the dummy bonding pad.

(20) A display device, including: a display panel; and the antenna device according to the above-described embodiments disposed on the display panel.

According to embodiments of the present invention, an antenna device may include a dummy bonding pad disposed at an outside of an area for antenna units on a bonding region of a substrate layer and physically spaced apart from the antenna units. The dummy bonding pad may have a floating pattern shape spaced apart from an area where the antenna unit is disposed, so that signal interference of the dummy bonding pad with respect to the antenna unit may be suppressed.

The dummy bonding pad is disposed at the outside of the area where the antenna unit is disposed, and thus may be formed to have a large area. Accordingly, adhesion and bonding stability between the antenna device and an external circuit structure may be improved. Additionally, when the external circuit structure is bonded, a pressure applied to the bonding region may be uniformly distributed, so that crack generation due to a bonding process may be suppressed.

An imaginary line including a lateral side of a radiator and the dummy bonding pad may be spaced apart in a width direction by a distance of half a wavelength or more of a resonance frequency of the radiator. Thus, signal loss and disturbance of the radiator may be suppressed, and a radiation concentration of the antenna unit may be increased.

A width of the dummy bonding pad may be half or more of a width of the antenna unit. A pressure applied to the antenna device when bonding the external circuit structure may be reduced to enhance structural stability.

The substrate layer may further include a buffer region, and the radiator may be disposed throughout the radiation region and the buffer region. A portion disposed in the buffer region of the radiator may have a solid structure. Accordingly, a resistance of the antenna unit may be reduced, and feeding/signal efficiency and radiation properties may be improved.

DETAILED DESCRIPTION OF THE EMBODIMENTS

According to exemplary embodiments of the present invention, an antenna device including a substrate layer and an antenna unit disposed on the substrate layer is provided. According to exemplary embodiments of the present invention, a display device including the antenna device is also provided. However, an application of the antenna structure is not limited to the display device, and the antenna structure may be applied to various objects or structures such as a vehicle, a home electronic appliance, an architecture, etc.

The antenna device may be fabricated in the form of, e.g., a microstrip patch antenna manufactured in the form of a transparent film. The antenna device may be applied to, e.g., a communication device for high-frequency or ultra-high frequency (e.g., 3G, 4G, 5G or higher) mobile communications.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

The terms “first”, “second”, “third”, “fourth”, “one end”, “other end”, “upper side”, “lower side”, “upper side”, “lower side”, etc., as used herein are not intended to limit an absolute position or order, but is used in a relative sense to distinguish different components or elements.

Figure 1:
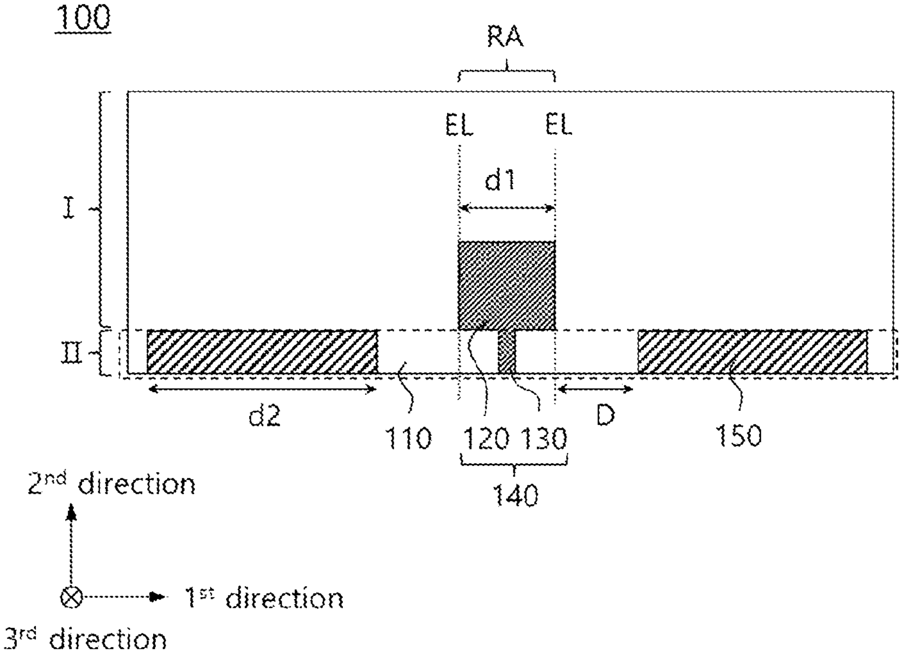
FIG. 1 is a schematic plan view illustrating an antenna device in accordance with example embodiments.

FIG. 1 is a schematic plan view illustrating an antenna device in accordance with example embodiments.

In FIG. 1, two directions that are parallel to a top surface of a substrate layer 110 to perpendicularly cross each other are defined as a first direction and a second direction. For example, the first direction may correspond to a width direction of the antenna device 100, and the second direction may correspond to a length direction of the antenna device 100. A third direction may correspond to a thickness direction of the antenna device 100. Definitions of the first direction, the second direction and the third direction may be equally applied in the accompanying drawings.

Referring to FIG. 1, the antenna device 100 may include an antenna unit 140 and a dummy bonding pad 150 disposed on the top surface of the substrate layer 110.

The substrate layer 110 may include, e.g., a transparent resin material. For example, the substrate layer 110 may include a polyester-based resin such as polyethylene terephthalate, polyethylene isophthalate, polyethylene naphthalate and polybutylene terephthalate; a cellulose-based resin such as diacetyl cellulose and triacetyl cellulose; a polycarbonate-based resin; an acrylic resin such as polymethyl (meth)acrylate and polyethyl (meth)acrylate; a styrene-based resin such as polystyrene and an acrylonitrile-styrene copolymer; a polyolefin-based resin such as polyethylene, polypropylene, a cycloolefin or polyolefin having a norbornene structure and an ethylene-propylene copolymer; a vinyl chloride-based resin; an amide-based resin such as nylon and an aromatic polyamide; an imide-based resin; a polyethersulfone-based resin; a sulfone-based resin; a polyether ether ketone-based resin; a polyphenylene sulfide resin; a vinyl alcohol-based resin; a vinylidene chloride-based resin; a vinyl butyral-based resin; an allylate-based resin; a polyoxymethylene-based resin; an epoxy-based resin; a urethane or acrylic urethane-based resin; a silicone-based resin, etc. These may be used alone or in a combination of two or more thereof.

The substrate layer 110 may include an adhesive material such as an optically clear adhesive (OCA), an optically clear resin (OCR), or the like. In some embodiments, the substrate layer 110 may include an inorganic insulating material such as glass, silicon oxide, silicon nitride, silicon oxynitride, etc.

In an embodiment, the substrate layer 110 may be provided as a substantially single layer.

In an embodiment, the substrate layer 110 may include a multi-layered structure of at least two layers. For example, the substrate layer 110 may include a base substrate and a dielectric layer, and may include an adhesive layer between the base substrate layer and the dielectric layer.

Impedance or inductance for the antenna device 100 may be formed by the substrate layer 110, so that a frequency band at which the antenna device 100 may be driven or operated may be adjusted. In some embodiments, a dielectric constant of the substrate layer 110 may be adjusted in a range from about 1.5 to about 12. If the dielectric constant exceeds about 12, a driving frequency may be excessively decreased, and driving in a desired high frequency or ultrahigh frequency band may not be implemented.

The substrate layer 110 may include a radiation region I and a bonding region II. The bonding region II may be provided as a region where the antenna device 100 is bonded to the circuit board 200 (see FIG. 8). For example, the bonding region II may be a region where the substrate layer 110 overlaps the circuit board 200 in the thickness direction (e.g., the third direction).

The antenna unit 140 may include a radiator 120 and a transmission line 130 connected to the radiator 120.

The radiator 120 may be disposed on the radiation region I of the substrate layer 110. In one embodiment, the radiator 120 may not be disposed on the bonding region II of the substrate layer 110. The radiator 120 may have, e.g., a polygonal plate shape.

The antenna unit 140 or the radiator 120 may be designed to have a resonance frequency of, e.g., a 3G, 4G, 5G or higher high frequency or ultra-high frequency band. For example, the resonance frequency of the radiator 120 may be in a range from about 20 GHz to 80 GHz.

In some embodiments, the resonance frequency of the radiator 120 may be about 50 GHz or higher. For example, the resonance frequency of the radiator 120 may be in a range from 50 GHz to 80 GHz, or may be in a range from 55 GHz to 77 GHz.

The transmission line 130 may extend from one side of the radiator 120. For example, the transmission line 130 may be connected to the radiator 120 to extend in a straight line shape along the length direction (e.g., the second direction) of the antenna device 100.

In one embodiment, the transmission line 130 may be formed as a single member substantially integral with the radiator 120.

The transmission line 130 may be disposed on the bonding region II of the substrate layer 110, or may be disposed throughout the radiation region I and the bonding region II.

The transmission line 130 may transmit a driving signal or a power applied from an antenna driving integrated circuit (IC) chip to the radiator 120, and may transmit an electromagnetic wave signal or an electrical signal of the radiator 120 to the antenna driving IC chip.

In some embodiments, a ground layer (not illustrated) may be disposed on a bottom surface of the substrate layer 110. In some embodiments, the ground layer may entirely cover the antenna unit 140 in the thickness direction.

In an embodiment, a conductive member of an display device to which the antenna device 100 is applied may serve as the ground layer. For example, the conductive member may include various electrodes or wirings such as, e.g., a gate electrode, a source/drain electrode, a pixel electrode, a common electrode, a scan line, a data line, etc., included in a thin film transistor (TFT) array panel.

In an embodiment, a metallic member disposed at a rear portion of the display device such as a SUS plate, a sensor member such as a digitizer, a heat dissipation sheet, etc., may serve as the ground layer.

The antenna unit 140 and the ground layer may include silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), tin (Sn), molybdenum (Mo), calcium (Ca) or an alloy containing at least one of the metals. These may be used alone or in a combination of at least two therefrom.

In an embodiment, the antenna unit 140 may include silver (Ag) or a silver alloy (e.g., silver-palladium-copper (APC)), or copper (Cu) or a copper alloy (e.g., a copper-calcium (CuCa)) to implement a low resistance and a fine line width pattern.

In some embodiments, the antenna unit 140 and the ground layer may include a transparent conductive oxide such as indium tin oxide (ITO), indium zinc oxide (IZO), indium zinc tin oxide (ITZO), zinc oxide (ZnOx), etc.

In some embodiments, the antenna unit 140 may include a stacked structure of a transparent conductive oxide layer and a metal layer. For example, the antenna unit 140 may include a double-layered structure of a transparent conductive oxide layer-metal layer, or a triple-layered structure of a transparent conductive oxide layer-metal layer-transparent conductive oxide layer. In this case, flexible property may be improved by the metal layer, and a signal transmission speed may also be improved by a low resistance of the metal layer. Corrosive resistance and transparency may be improved by the transparent conductive oxide layer.

The antenna unit 140 may include a blackened portion, so that a reflectance at a surface of the antenna unit 140 may be decreased to suppress a visual pattern recognition due to a light reflectance.

In an embodiment, a surface of the metal layer included in the antenna unit 140 may be converted into a metal oxide or a metal sulfide to form a blackened layer. In an embodiment, a blackened layer such as a black material coating layer or a plating layer may be formed on the metal layer. The black material or plating layer may include silicon, carbon, copper, molybdenum, tin, chromium, molybdenum, nickel, cobalt, or an oxide, sulfide or alloy containing at least one therefrom.

A composition and a thickness of the blackened layer may be adjusted in consideration of a reflectance reduction effect and an antenna radiation property.

In example embodiments, the dummy bonding pad 150 may be disposed on the bonding region II of the substrate layer 110. In one embodiment, the dummy bonding pad 150 may not be disposed on the radiation region I of the substrate layer 110.

An adhesion to, e.g., the circuit board 200 (see FIG. 8) and an conductive intermediate structure may be increased by the dummy bonding pad 150 disposed on the bonding region II of the substrate layer 110. Thus, bonding stability between the antenna device 140 and the circuit board 200 may be improved.

The dummy bonding pad 150 may be physically spaced apart from the antenna unit 140 in the bonding region II. For example, the dummy bonding pad 150 may have a floating pattern shape electrically and physically separated from the radiator 120 and the transmission line 130.

The dummy bonding pad 150 may be disposed at an outside of an area between extension lines EL from both lateral sides 120*b* of the radiator 120. The area between the extension lines EL of both lateral sides 120*b* of the radiator 120 may serve as an antenna active area RA.

Figure 2:
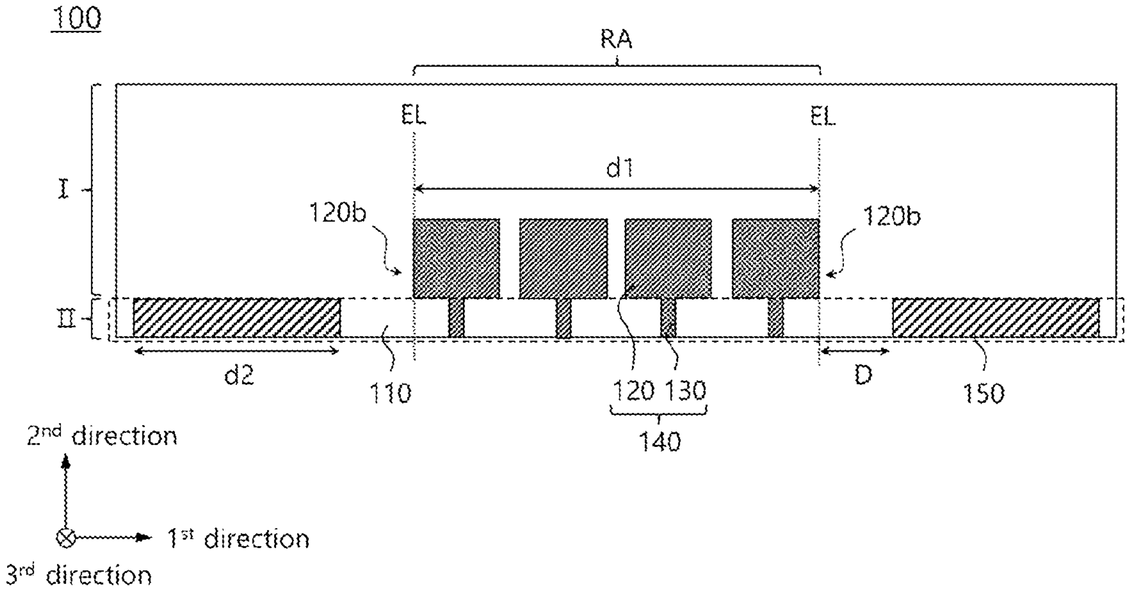
FIG. 2 is a schematic plan view illustrating an antenna device in accordance with example embodiments.

FIG. 2 is a schematic plan view illustrating an antenna device in accordance with example embodiments.

Referring to FIG. 2, a plurality of the antenna units 140 may be arranged in the width direction to form an antenna array. In this case, a signal intensity transmitted and received may be amplified, and a radiation directivity may also be improved.

The antenna active area RA may be an area between the extension lines EL of outermost lateral sides of outermost radiators in the width direction among the plurality of the radiators 120.

The dummy bonding pad 150 may be not disposed within the antenna active area RA, so that signal interference and disturbance to the radiator 120 may be prevented. Thus, even when the antenna device 100 is driven in the ultra-high frequency band of 50 GHz or more, signal loss may be suppressed while improving radiation efficiency and gain of the antenna device 100.

In example embodiments, a spacing distance D between the extension line EL of one lateral side 120*b* of the radiator 120 and the dummy bonding pad 150 may be equal to or greater than half wavelength (λ/2) corresponding to a resonance frequency of the radiator 120. For example, the distance D is the shortest distance in the width direction between the dummy bonding pad 150 and the extension line EL of one lateral side 120*b* of the radiator 120 that is the closest to the dummy bonding pad 150.

Accordingly, signal interference of the dummy bonding pad 150 to the radiator 120 may be suppressed. For example, when the radiator 120 is driven in a high frequency band of 50 GHz or more, interference by adjacent electrodes or conductive patterns may become greater to degrade gain and coverage of the antenna device 100.

As the antenna unit 140 is spaced apart from the dummy bonding pad 150 by at least half a wavelength (λ/2) of the resonance frequency, signal loss and disturbance of the radiator 120 may be suppressed, and radiational concentration from the antenna unit 140 may be increased. Accordingly, both the gain and directivity of the antenna device 100 may be enhanced.

In some embodiments, the spacing distance D between the dummy bonding pad 150 and the extension line EL of one lateral side 120*b* of the radiator 120 is in a range from half a wavelength (λ/2) to one wavelength (λ) corresponding to the resonance frequency of the radiator 120. Within the above range, mutual interference between the dummy bonding pad 150 and the radiator 120 may be prevented and high-gain radiation properties may be implemented while suppressing signal loss of the radiator 120.

In example embodiments, a width d2 of the dummy bonding pad 150 may be greater than or equal to half a wavelength (λ/2) wavelength corresponding to the resonance frequency of the radiator 120.

In an embodiment, the width d2 of the dummy bonding pad 150 may be half or more of a width d1 of the antenna unit 140. For example, the width may refer to the longest width of each of the dummy bonding pad 150 and the antenna unit 140 in the width direction (e.g., the first direction).

For example, when a plurality of the radiators 120 are arranged to form an antenna array, the width d2 of the antenna unit 140 is a distance in the width direction between the extension lines EL of the outermost lateral sides 120*b* included in the outermost radiators 120 of the antenna array.

Accordingly, the dummy bonding pad 150 may have a large area, so that a pressure applied to the antenna device 100 when the external circuit structure is bonded may be uniformly distributed to a surrounding. Therefore, cracks in the antenna device 100 that may be caused during the bonding process of the external circuit structure may be suppressed, and bonding stability and reliability may be improved.

Further, one dummy bonding pad 150 may cover half or more of the width of the antenna unit 140, so that noise absorption efficiency, signal quality and horizontal radiation properties may be improved.

In some embodiments, the width d1 of the dummy bonding pad 150 may be less than or equal to the width d2 of the antenna unit 140. Accordingly, signal interference of the dummy bonding pad 150 to the radiator 120 may be suppressed, and thus high-reliability radiation may be implemented. Additionally, a space occupied by the dummy bonding pad 150 may be reduced, so that the antenna device 100 having a compact dimension and high integration may be implemented while improving bonding stability to the external circuit structure.

In example embodiments, a pair of the dummy bonding pads 150 may be disposed to face each other with the antenna unit 140 interposed therebetween. In this case, each of the dummy bonding pads 150 may be adjacent to the extension line EL of one lateral side 120*b* of the radiator 120 by the spacing distance of a half wavelength (λ/2) or more of a wavelength corresponding to the resonance frequency of the radiator 120 in the width direction.

In some embodiments, a sum of the widths d1 of the pair of dummy bonding pads 150 may be greater than or equal to the width d2 of the antenna unit 140. Accordingly, the adhesion between the antenna device 100 and the external circuit structure (e.g., the conductive intermediate structure) may be improved, and generation of cracks due to the bonding process of the external circuit structure may be suppressed.

In some embodiments, the dummy bonding pad 150 may include the above-described metal and alloy in the antenna unit 140, or may include a transparent metal oxide. In an embodiment, the dummy bonding pad 150 may include a stacked structure of a transparent conductive oxide layer and a metal layer.

For example, the dummy bonding pad 150 may include at least one of copper, aluminum, silver, nickel, chromium, cobalt, molybdenum, titanium, palladium, an oxide electrode, or an alloy thereof.

In some embodiments, the dummy bonding pad 150 may have a solid structure to distribute pressure, prevent cracks and improve noise absorption efficiency and horizontal radiation properties.

In some embodiments, the antenna device 100 may further include an alignment mark disposed on the bonding region II of the substrate layer 110. The alignment mark may be electrically/physically spaced apart from the dummy bonding pad 150 around the dummy bonding pad 150.

The alignment mark may be disposed around the dummy bonding pad 150, so that alignment of the antenna unit 140 and the dummy bonding pad 150 may be easily performed. Thus, mis-alignment of the circuit board or the conductive intermediate structure to the bonding region II may be prevented.

In an embodiment, the alignment mark may be bonded to the circuit board or the conductive intermediate structure together with the dummy bonding pad 150.

Figure 3:
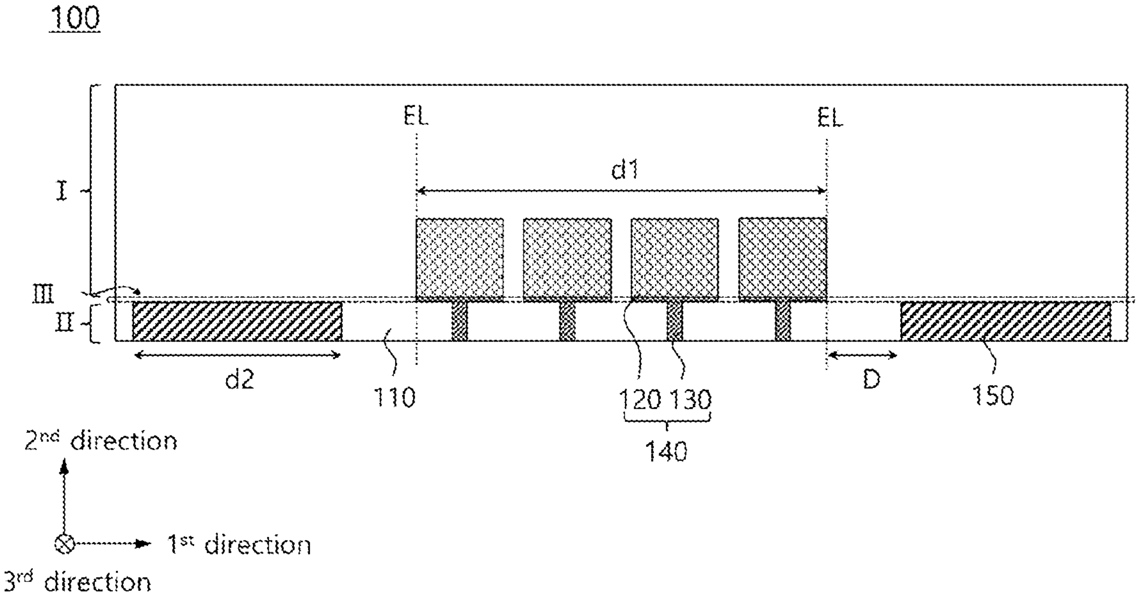
FIGS. 3 and 4 are schematic plan views illustrating an antenna device in accordance with example embodiments.
Figure 4:
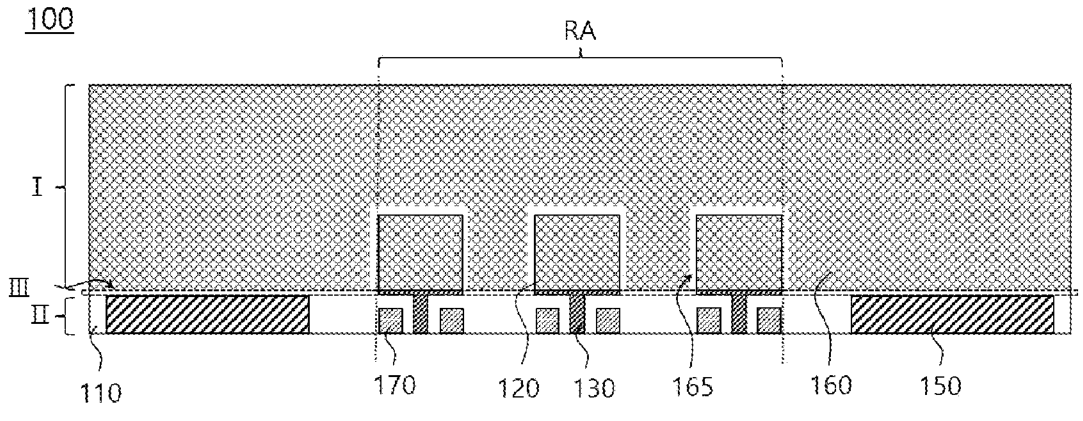

FIGS. 3 and 4 are schematic plan views illustrating an antenna device in accordance with example embodiments.

Referring to FIG. 3, the substrate layer 110 may further include a buffer region III disposed between the radiation region I and the bonding region II.

In example embodiments, the radiator 120 may be disposed commonly on the radiation region I and the buffer region III.

In some embodiments, a portion disposed on the radiation region I of the radiator 120 may include a mesh structure. Accordingly, transmittance of the antenna unit 140 disposed on the radiation region I may be improved.

In some embodiments, a portion disposed on the buffer region III of the radiator 120 may have a solid structure. Accordingly, a resistance of the radiator 120 may be entirely lowered, and signal/power loss of the antenna device 100 may be suppressed. Thus, gain and coverage of the antenna device 100 may be improved even in the high frequency or ultra-high frequency band.

In some embodiments, the transmission line 130 may be disposed on the bonding region II. For example, the transmission line 130 may extend from the portion disposed on the buffer region III of the radiator 120.

In an embodiment, the transmission line 130 may have a solid structure to improve a feeding efficiency. Accordingly, feeding and signal transmission/reception efficiency may be improved, and bonding reliability and structural stability to the external circuit structure may be improved.

In an embodiment, the transmission line 130 may be formed as a single member substantially integral with the portion disposed on the buffer region III of the radiator 120.

In an embodiment, the bonding region II and the buffer region III of the substrate layer 110 may be positioned in a non-display area of the display device, e.g., a bezel area.

Referring to FIG. 4, the antenna device 100 may further include a dummy mesh pattern 160 disposed around the antenna unit 140. For example, the dummy mesh pattern 160 may be electrically and physically separated from the antenna unit 140 by a separation region 165.

In An embodiment, the dummy mesh pattern 160 may be formed on the radiation region I of the substrate layer 110. For example, a conductive layer containing the above-described metal or alloy may be formed on the substrate layer 110. A mesh structure may be formed while etching the conductive layer along a profile of the radiator 120. Thus, the dummy mesh pattern 160 spaced apart from the radiator 120 by the separation region 165 may be formed.

As the dummy mesh pattern 160 is distributed on the radiation region I of the substrate layer 110, optical properties around the radiator 120 may become uniform. Thus, the antenna device 100 may be prevented from being visually recognized.

In example embodiments, the dummy bonding pad 150 may not be disposed on the buffer region III. For example, the dummy bonding pad 150 may be disposed only on the bonding region II of the substrate layer 110.

In example embodiments, the antenna device 100 may include a plurality of the radiators 120 and transmission lines 130 connected to each of the plurality of radiators 120.

In an embodiment, a plurality of the antenna units 140 may be arranged in the width direction to form the antenna array. For example, the plurality of the radiators 120 may be arranged in a single row along the width direction on the radiation region I of the substrate layer 110.

In an embodiment, a conductive structure such as an electrode or a conductive pattern may not be disposed in an area between neighboring radiators 120 or an area between neighboring transmission lines 130.

Accordingly, signal interference and disturbance of the antenna unit 140 due to adjacent conductive structures may be suppressed, and signal transmission/reception efficiency and radiation reliability of the antenna unit 140 in the high frequency or ultra-high frequency band may be further improved.

Additionally, a distance between the adjacent radiators 120 may be shortened, the gain of the antenna unit 140 may be enhanced, and a dimension of the antenna device 100 may be further decreased and a degree of integration of the antenna device 100 may be increased. Further, radiation concentration may be increased by the plurality of the radiators 120 arranged in the single row in the width direction. Thus, a signal transmission/reception speed and a transmission distance of the antenna unit 140 may be increased even in the ultra-high frequency band by the array-shaped radiators 120.

In an embodiment, the antenna unit 140 may further include a ground pad 170. The ground pad 170 may be electrically and physically separated from the transmission line 130 and may be disposed around the transmission line 130.

In an embodiment, a pair of the ground pads 170 may be disposed to face each other with the transmission line 130 interposed therebetween. The ground pad 170 may be disposed on the bonding region II of the substrate layer 110 and may have a solid structure including the metal or alloy as described above.

The ground pad 170 may be disposed in the antenna active area RA. For example, the ground pad 170 may be disposed within the antenna active area RA, or at least a portion of the ground pad 170 may be disposed in antenna active area RA. Thus, a high integration of the antenna units 140 may be implemented, and the dummy bonding pad 150 and the ground pad 170 may be sufficiently spaced apart from each other so that mutual interference may be prevented.

Figure 5:
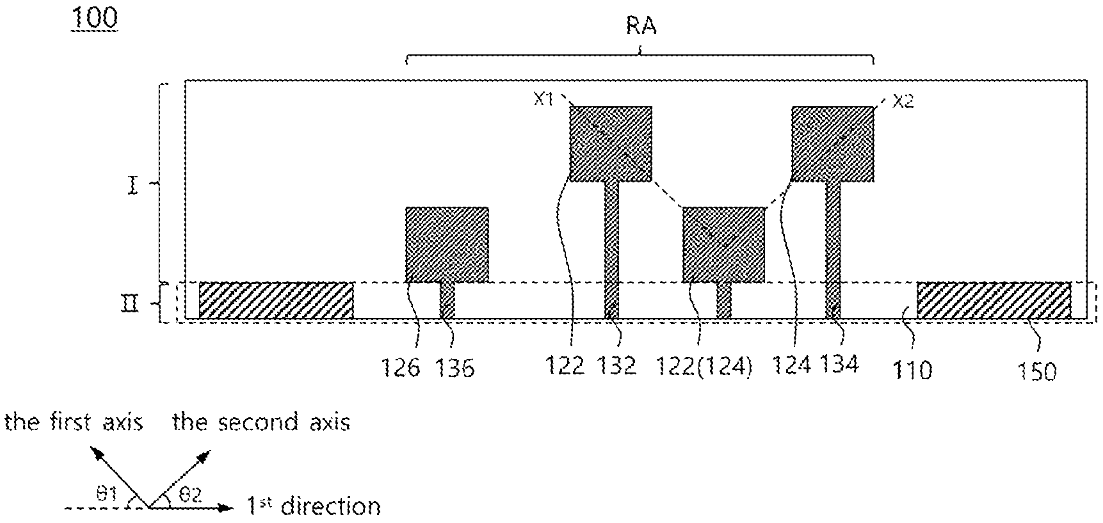
FIG. 5 is a schematic plan view illustrating an antenna device in accordance with example embodiments.

FIG. 5 is a schematic plan view illustrating an antenna device in accordance with example embodiments.

Referring to FIG. 5, the antenna device 100 may include a plurality of the antenna units 140 arranged along the first axis X1 and the second axis X2 on the substrate layer 110.

The antenna device 100 may include a plurality of first radiators 122 arranged along the first axis X1 and a plurality of second radiators 124 arranged along the second axis X2. For example, the first axis X1 may refer to a direction in which an imaginary straight line connecting centers of the first radiators 122 extends. For example, the second axis X2 may refer to a direction in which an imaginary straight line connecting centers of the second radiators 124 extends.

In some embodiments, the first axis X1 and the second axis X2 may be perpendicular to each other. Thus, the antenna device 100 can detect changes of signal strengths of two orthogonal axes. For example, position changes and distances in all directions on an X-Y coordinate system may be measured based on the collected information.

For example, the antenna device 100 may be used for a motion sensor that may recognize motions and gestures in two axes perpendicular to each other, or may be used as a radar that may detect a distance. The radiators 120 may be provided as receiving radiators for detecting the motions or the distance.

In some embodiments, the antenna device 100 includes first transmission lines 132 that may be individually connected to each of the first radiators 122 and second transmission lines 134 that may be individually connected to each of the second radiators 124.

Accordingly, each of the plurality of first radiators 122 and second radiators 124 may have independent radiation properties and signal reception. Thus, change of signals along the first axis X1 and change of signals along the second axis X2 according to the positional change of a sensing object may be respectively measured, and the motion and distance of the sensing object can be sensed by the measured signals.

In an embodiment, the transmission lines 130 may be located at the same layer as that of the radiators 120. For example, the first radiator 122 and the first transmission line 132 may be positioned at the same level of the top surface of the substrate layer 110. For example, the second radiator 124 and the second transmission line 134 may be positioned at the same level of the top surface of the substrate layer 110.

In some embodiments, the first radiators 122 and the second radiators 124 may share one radiator 120 in common.

The common radiator designated as 122(124) may serve as a reference point for measuring the change of signal intensity along the first axis X1 and the second axis X2. For example, a change of the position of the sensing object may be sensed by measuring the changes of signal intensity in the first axis X1 and the second axis X2 based on the signal intensity of the common radiator.

In some embodiments, the first axis X1 and the second axis X2 may be inclined by a predetermined tilting angle with respect to the width direction of the substrate layer 110.

For example, the first axis X1 may be inclined by a first tilting angle θ1 with respect to the width direction of the substrate layer 110, and the second axis X2 may be inclined by a second tilting angle θ2 respect to the width direction of the substrate layer 110.

In some embodiments, each of the first tilting angle θ1 and the second tilting angle θ2 may be in a range from 15° to 75°, preferably from 30° to 60°. Within this range, the change of signal strength according to the change of position along the first axis or the second axis may be accurately measured. Accordingly, signal transmission/reception efficiency and sensing sensitivity of the antenna device 100 may be improved, and errors in sensing movement and motion may be reduced.

In example embodiments, the antenna device 100 may further include a third radiator 126 physically separated from the first radiator 122 and the second radiator 124. The third radiator 126 may serve as, e.g., a transmitting radiator.

In some embodiments, the antenna device 100 may include a third transmission line 136 connected to the third radiator 126. For example, the third transmission line 136 may branch and extend from one side of the third radiator 126.

In an embodiment, the third radiator 126 and the third transmission line 136 may be positioned at the same level of the top surface of the substrate layer 110.

In example embodiments, the dummy bonding pad 150 may have a polygonal plate shape. For example, the dummy bonding pad 150 may have a trapezoidal shape, an inverted trapezoidal shape or a rectangular shape.

In some embodiments, at least one side of the dummy bonding pad 150 may have a bent line shape, a wavy shape or a sawtooth shape. For example, an edge or a boundary of the dummy bonding pad 150 may have a profile of the bent line, the wavy shape or the sawtooth shape.

Figure 6:
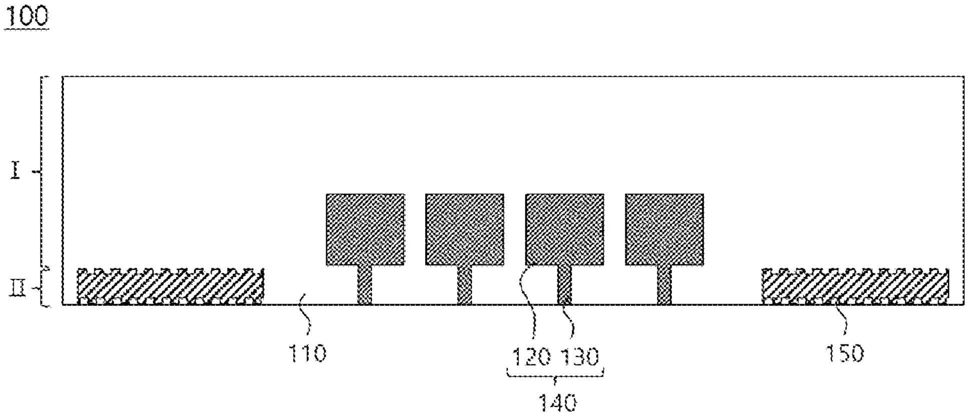
FIGS. 6 and 7 are schematic plan views illustrating an antenna device in accordance with example embodiments.
Figure 7:
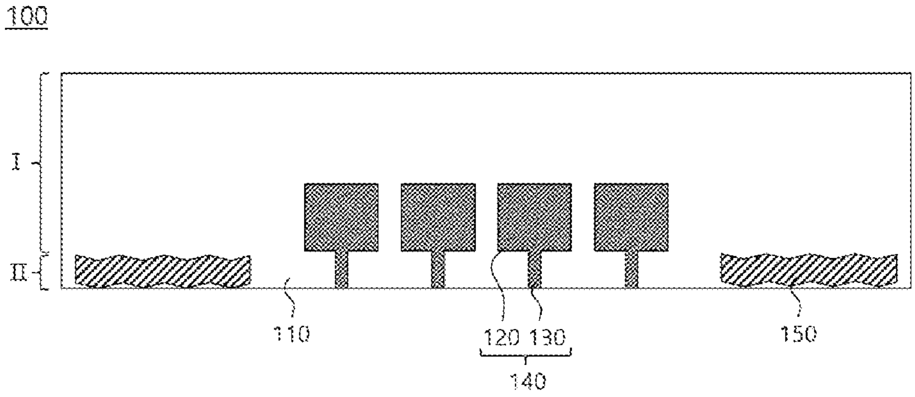

FIGS. 6 and 7 are schematic plan views illustrating an antenna device in accordance with example embodiments.

Referring to FIG. 6, an edge of the dummy bonding pad 150 may have substantially a sawtooth profile.

For example, at least one side of the dummy bonding pad 150 may extend in the sawtooth shape between two adjacent vertices.

Referring to FIG. 7, an edge of the dummy bonding pad 150 may have a substantially wavy profile.

For example, at least one side of the dummy bonding pad 150 may extend in the wavy shape between two adjacent vertices.

As an edge of the dummy bonding pad 150 extends in the bent line, the wavy shape or the sawtooth shape, a bonding area may be structurally increased to further improve bonding stability. Additionally, the pressure applied to the antenna device 100 when bonded to the external circuit structure may be easily dispersed, so that generation of cracks in the dummy bonding pad 150 may be suppressed.

Thus, bonding stability between the antenna device 100 and the external circuit structure such as the conductive intermediate structure may be improved, and structural stability of the antenna device 100 may be improved.

In example embodiments, the antenna unit 140 and the dummy bonding pad 150 may be disposed at the same level or on at same layer. For example, the radiator 120, the transmission line 130 and the dummy bonding pad 150 may be disposed at the same level of the substrate layer 110.

The antenna unit 140 and the dummy bonding pad 150 may be positioned at the same level, so that the pressure applied to the antenna unit 140 may be more effectively distributed by the dummy bonding pad 150. Accordingly, stress concentration and crack generation on the antenna unit 140 may be prevented.

In some embodiments, the antenna unit 140 and the dummy bonding pad 150 may be formed to have similar thicknesses. For example, the antenna unit 140 and the dummy bonding pad 150 may be formed to have substantially the same thickness. Accordingly, structural stability of the antenna device 100 may be further improved, and generation of cracks in the antenna unit 140 due to the bonding/adhering process may be suppressed.

Figure 8:
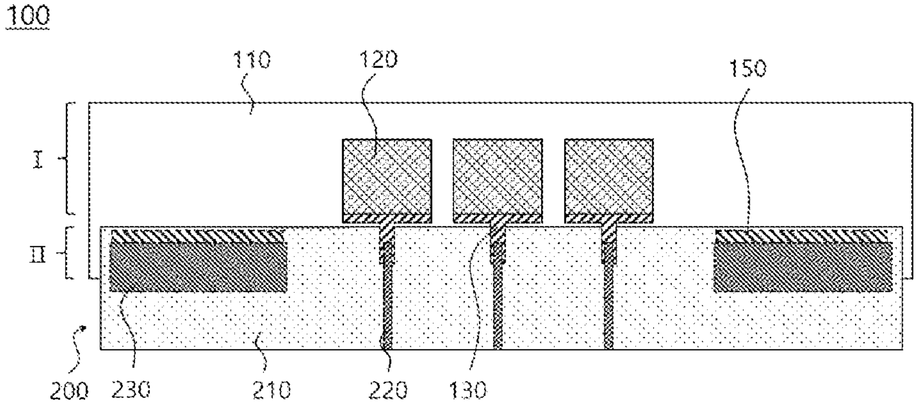
FIG. 8 is a schematic plan view illustrating an antenna device in accordance with example embodiments.

FIG. 8 is a schematic plan view illustrating an antenna device in accordance with example embodiments.

Referring to FIG. 8, the antenna device 100 may include a circuit board 200 electrically connected to the antenna unit 140. For example, the circuit board 200 may be bonded to the antenna unit 140 and the dummy bonding pad 150 on the bonding region II.

In an embodiment, the circuit board 200 may be a flexible printed circuit board (FPCB).

The circuit board 200 may include a core layer 210, a circuit wiring 220 disposed on a bottom surface of the core layer 210, and a bonding portion 230 disposed on the bottom surface of the core layer 210 and physically separated from the circuit wiring 220.

The circuit wiring 220 may serve as an antenna feeding wiring. For example, one end of the circuit wiring 220 may be exposed to an outside, and the exposed one end of the circuit wiring 220 may be bonded to the transmission line 130. Thus, the circuit wiring 220 and the antenna unit 140 may be electrically connected to each other.

For example, the circuit wiring 220 of the circuit board 200 may be electrically connected to the antenna unit 140 by being bonded to the transmission line 130 disposed on the bonding region II of the substrate layer.

The bonding portion 230 may be disposed around a terminal end portion of the circuit wiring 220. For example, the bonding portion 230 may be disposed at the same level or at the same layer as that of the circuit wiring 220.

The bonding portion 230 may be disposed to overlap the dummy bonding pad 150 in the thickness direction.

In an embodiment, the antenna device 100 may further include a conductive intermediate structure disposed between the transmission line 130 and the circuit board 200, or between the dummy bonding pad 150 and the circuit board 200. For example, the bonding portion 230 may be bonded to the dummy bonding pad 150 through the conductive intermediate structure. For example, the circuit wiring 220 and the antenna unit 140 may be bonded to each other through the conductive intermediate structure.

For example, the antenna unit 140, the conductive intermediate structure and the circuit board 200 may be in a sequential contact or stack on the bonding region II.

In an embodiment, the conductive intermediate structure may include an anisotropic conductive film (ACF).

In some embodiments, the circuit wiring 220 and the bonding portion 230 may be formed of the above-described metal or alloy, and may include a transparent metal oxide. In an embodiment, the circuit wiring 220 and the bonding portion 230 may include a stacked structure of a transparent conductive oxide layer and a metal layer.

The core layer 210 may include, e.g., a flexible resin such as polyimide resin, modified polyimide (MPI), an epoxy resin, polyester, a cyclo olefin polymer (COP) or a liquid crystal polymer (LCP).

An antenna driving IC chip may be mounted on the circuit board 200. In an embodiment, the circuit board 200 may be electrically connected to an intermediate circuit board (e.g., a main board) on which the driving IC chip is mounted. The antenna device 100 may be powered and driven by the antenna driving IC chip.

In some embodiments, a motion sensor driving circuit may be mounted on the circuit board 200. Accordingly, the antenna unit 140 may be coupled to the motion sensor driving circuit through the circuit board 200.

In an embodiment, the motion sensor driving circuit may include a proximity sensor, a gesture sensor, an acceleration sensor, a gyroscope sensor, a position sensor, or a geomagnetic sensor, etc.

In an embodiment, the motion sensor driving circuit may include a motion detection circuit. Signal information transferred from the antenna device 100 may be converted/calculated into a location information or a distance information through the motion detection circuit.

Figure 9:
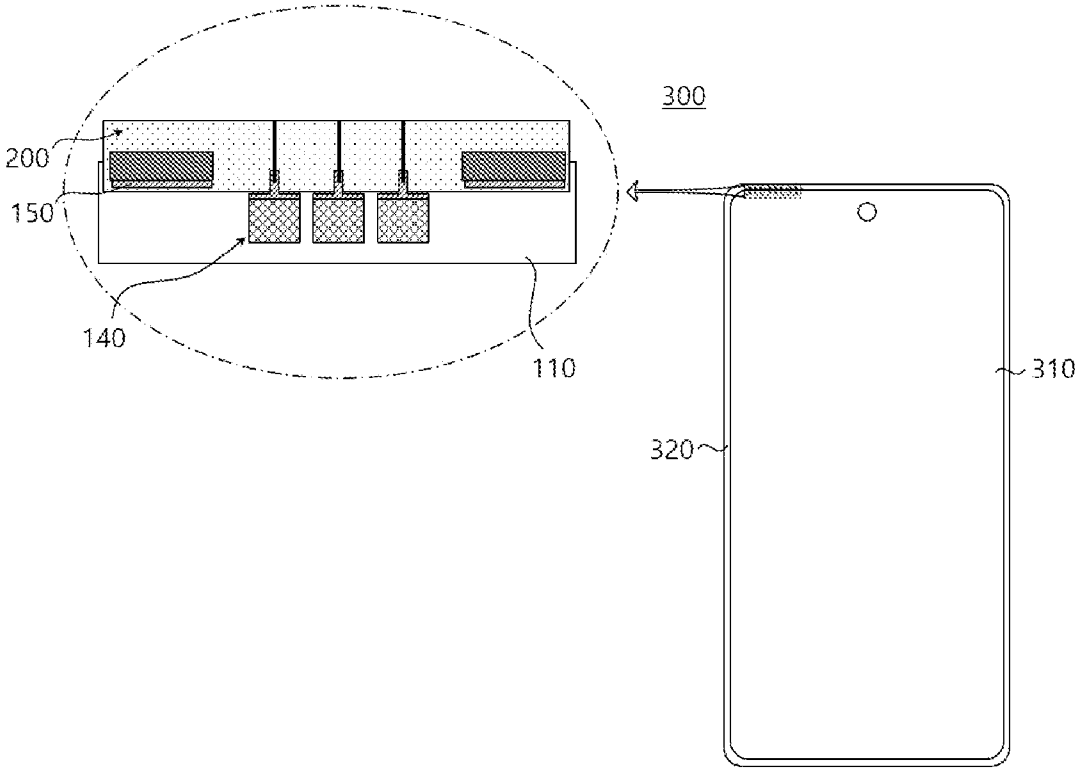
FIG. 9 is a schematic plan view illustrating a display device in accordance with example embodiments.

FIG. 9 is a schematic plan view illustrating a display device in accordance with example embodiments.

FIG. 9 illustrates a front portion or a window surface of the display device 300. The front portion of the display device 300 may include a display area 310 and a non-display area 320. The non-display area 320 may correspond to, e.g., a light-shielding portion or a bezel portion of an image display device.

The antenna structure 100 may be disposed toward the front portion of the display device 300, and may be disposed on, e.g., a display panel.

The above-described antenna device 100 may be disposed toward the front portion of the display device 300, and may be disposed on, e.g., a display panel.

In some embodiments, the above-described antenna device 100 may be attached to the display panel in the form of a film.

The antenna device 100 may be formed over the display area 310 and the non-display area 320 of the display device 300. In an embodiment, the antenna device 100 may be disposed such that the bonding region II of the substrate layer 110 may overlap the non-display area 320 of the display device and the radiation region I of the substrate layer 110 may overlap the display area 310 of the display device.

If the substrate layer 110 further includes the buffer region III, the antenna device 100 may be disposed such that the buffer region III of the substrate layer 110 may overlap the non-display area 320 of the display device.

In this case, a portion disposed on the radiation region I of the antenna unit 140 may include a mesh structure, and a portion disposed on the buffer region III and the bonding region II of the antenna unit 140 may have a solid structure.

Accordingly, deterioration of transmittance in the display area 310 may be prevented and a visual recognition of the antenna device 100 may be suppressed, thereby preventing degradation of an image quality of the display device 300. Additionally, signal efficiency and radiation properties of the antenna device 100 may be improved, and bonding reliability and structural stability may be improved.

In some embodiments, the antenna device 100 may be bent using the circuit board 200 so that, e.g., the intermediate circuit board and the antenna driving IC chip may be disposed at a rear portion of the display device 300.

What is claimed is:

1. An antenna device comprising:

a substrate layer comprising a radiation region and a bonding region;

an antenna unit comprising a radiator disposed on the radiation region of the substrate layer, and a transmission line disposed on the substrate layer and connected to the radiator; and a dummy bonding pad disposed on the bonding region of the substrate layer and physically spaced apart from the radiator in a width direction, wherein the dummy bonding pad and the radiator are disposed at the same level-on a top surface of the substrate layer.

2. The antenna device according to claim 1, wherein the dummy bonding pad is disposed at an outside of an area between extension lines of both lateral sides of the radiator, and a spacing distance in the width direction between the dummy bonding pad and the extension line of one lateral side of the radiator is equal to or greater than half a wavelength ($\lambda/2$) of a resonance frequency of the radiator.

3. The antenna device according to claim 1, wherein a width of the dummy bonding pad is equal to or greater than half a wavelength ($\lambda/2$) of a resonance frequency of the radiator.

4. The antenna device according to claim 1, wherein the dummy bonding pad comprises a pair of dummy bonding pads facing each other with the antenna unit interposed therebetween.

5. The antenna device according to claim 4, wherein a sum of widths of the pair of dummy bonding pads is greater than or equal to a width of the antenna unit.

6. The antenna device according to claim 1, wherein the dummy bonding pad has a trapezoidal shape, an inverted trapezoidal shape or a rectangular shape.

7. The antenna device according to claim 6, wherein at least one side of the dummy bonding pad extends in a bent line shape, a wavy shape or a sawtooth shape.

8. The antenna device according to claim 1, wherein the substrate layer further comprises a buffer region disposed between the radiation region and the bonding region, and the radiator is disposed on the radiation region and the buffer region, a portion disposed on the radiation region of the radiator has a mesh structure, and a portion disposed on the buffer region of the radiator has a solid structure.

9. The antenna device according to claim 8, wherein the transmission line is disposed on the bonding region of the substrate layer and has a solid structure.

10. The antenna device according to claim 8, wherein the dummy bonding pad is not disposed on the buffer region of the substrate layer.

11. The antenna device according to claim 8, further comprising a dummy mesh pattern disposed around the antenna unit and spaced apart from the antenna unit.

12. The antenna device according to claim 1, wherein a plurality of the antenna units are arranged in the width direction to form an antenna array, and the dummy bonding pad is disposed at an outside of a region between extension lines of lateral sides of outermost radiators in the antenna array.

13. The antenna device according to claim 1, wherein the substrate layer has an antenna active area where the antenna unit is disposed, and the dummy bonding pad is disposed at an outside of the antenna active area.

14. The antenna device according to claim 13, wherein the antenna unit further comprises a ground pad disposed around the transmission line and spaced apart from the radiator and the transmission line.

15. The antenna device according to claim 1, wherein a thickness of the antenna unit and a thickness of the dummy bonding pad are the same.

16. The antenna device according to claim 1, wherein a resonance frequency of the radiator is in a range from 50 GHz to 80 GHz.

17. The antenna device according to claim 1, further comprising a circuit board electrically connected to the antenna unit.

18. The antenna device according to claim 17, further comprising a conductive intermediate structure connecting the circuit board and the dummy bonding pad.

19. A display device comprising:

a display panel; and the antenna device according to claim 1 disposed on the display panel.

* * * * *